United States Patent
Schneider (10) Patent No.: US 9,646,409 B2
(45) Date of Patent: May 9, 2017

(54) GENERATION OF A DISPLAY DATA SET WITH VOLUME RENDERING

(71) Applicant: Robert Schneider, Roβtal (DE)

(72) Inventor: Robert Schneider, Roβtal (DE)

(73) Assignee: Siemens Healthcare GMBH, Erlangen (DE)

(*) Notice: Subject to any disclaimer, the term of this patent is extended or adjusted under 35 U.S.C. 154(b) by 0 days.

(21) Appl. No.: 14/972,283

(22) Filed: Dec. 17, 2015

(65) Prior Publication Data

US 2016/0180576 A1 Jun. 23, 2016

(30) Foreign Application Priority Data

Dec. 17, 2014 (EP) .................................... 14198618

(51) Int. Cl.
*G06T 15/08* (2011.01)
*G06T 19/00* (2011.01)
*G06T 17/20* (2006.01)
*G06T 15/00* (2011.01)
(Continued)

(52) U.S. Cl.
CPC .............. *G06T 15/08* (2013.01); *G06T 19/00* (2013.01); *G06T 15/00* (2013.01); *G06T 15/20* (2013.01); *G06T 17/00* (2013.01); *G06T 17/20* (2013.01); *G06T 17/205* (2013.01)

(58) Field of Classification Search
CPC ....... G06T 17/20; G06T 17/205; G06T 19/00; G06T 17/00; G06T 15/10; G06T 15/00
See application file for complete search history.

(56) References Cited

U.S. PATENT DOCUMENTS

2008/0091395 A1* 4/2008 Svakhine ................ G06T 15/08
  703/9
2015/0006113 A1* 1/2015 Gautron .................. G01J 1/42
  702/189

OTHER PUBLICATIONS

Schulze et al. "Integrating pre-integration into the shear-warp algorithm." Proceedings of the 2003 Eurographics/IEEE TVCG Workshop on Volume graphics. ACM, 2003.*

(Continued)

*Primary Examiner* — James A Thompson
*Assistant Examiner* — Tapas Mazumder
(74) *Attorney, Agent, or Firm* — Lempia Summerfield Katz LLC (57) ABSTRACT

A display data set depicting a three-dimensional source data set of display parameters is generated through volume rendering. Integration distance is subdivided based on a fixed predetermined target sampling distance independent of a desired sampling distance. The number of subsections minus one correspond to integrations over different subsections with front and back values of the display parameter as a target sampling distance opacity. A contribution of the volume-rendering integral and a target sampling distance color coefficient are based on the target sampling distance opacity. Target sampling distance opacities and target sampling distance color coefficients are determined based on pre-integration tables for contributions of the volume-rendering integral. Third opacities are calculated and converted to the desired sampling distance from target sampling distance opacities and the ratio of desired sampling distance to target sampling distance. Third color coefficients are calculated, and the volume-rendering integral is determined from the contributions.

20 Claims, 2 Drawing Sheets

(51) Int. Cl.
*G06T 17/00* (2006.01)
*G06T 15/20* (2011.01)

(56) References Cited

OTHER PUBLICATIONS

Weiler et al. "Hardware-based ray casting for tetrahedral meshes." Proceedings of the 14th IEEE Visualization 2003 (VIS'03). IEEE Computer Society, 2003.*
Espinha R et al: "High-Quality Hardware-Based Ray-Casting Volume Rendering Using Partial Pre-Integration," IEEE Computer Society, Los Alamitos, Calif., pp. 273-280, XP010897156, 001: 10.1109/SIBGRAPI.2005.29 ISBN: 978-0-7695-2389-7, 2005.
European Office action for related European Application No. 14198618.2, dated Jun. 25, 2015, with English Translation.
Hardware-Accelerated Volume and Isosurface Rendering Based on Cell-Projection; IEEE Computer Society Press 2000, pp. 109-116.
High-Quality Pre Integrated Volume Rendering Using Hardware-Accelerated Pixel Shading, Proceedings of the ACM SIGGRAPH/EUROGRAPHICS workshop on Graphics Hardware, 2001 pp. 9-16.
J. Kniss et al.: Gaussian Transfer Functions for Multi-Field Volume Visualization, Proceedings of the 14th IEEE Visualization Conference (VIS'03), pp. 497-504, 2003.
J.-F. El Hajjar et al.: Second Order Pre-Integrated Volume Rendering, IEEE Pacific Visualisation Symposium 2008, Kyoto, pp. 9-16, 2008.
J.P. Schulze et al.: Integrating Pre-Integration Into the Shear-Warp Algorithm, Volume Graphics, pp. 109-118, 2003.
M. Kraus et al.: Pre-Integrated Volume Rendering, The Visualization Handbook, Hansen C.D., Johnson, (Eds.) Academic Press, pp. 211-228, 2004.
M. Kraus: Pre-Integrated Volume Rendering for Multi-Dimensional Transfer Functions, IEEE/EG Symposium on Volume and Boint-Based Graphics, pp. 1-8, 2008.
Marco Ament et al: "Direct Interval Volume Visualization," IEEE Transactions on Visualization and Computer Graphics, IEEE Service Center, Los Alamitos, vol. 16, Nr. 6, pp. 1505-1514, XP011327233, ISSN: 1077-2626, 001: 10.1109/TVCG.2010.145, 2010.
N. Max et al.: Area and Volume Coherence for Efficient Visualization of 3D Scalar Functions, ACM Computer Graphics, Proceedings San Diego Workshop on Volume Visualization, vol. 24, No. 5, pp. 27-33, 1990.
Schulze J P et al: "Integrating pre-integration into the shear-warp algorithm," ACM International Conference Proceeding Series—Proceedings of the 2003 EUROGRAPHICS/IEEE TVCG Workshop on Volume Graphics, VG '03 2003 Association for Computing Machinery USA, Bd. 45, 2003, pp. 109-118+ 169, 001: 10.1145/827051 .827068, 2003.
St. Röttger et al.: Smart Hardware-Accelerated Volume Rendering, Proceedings of EG/IEEE TCVG Symposium on Visualization VisSym '03, pp. 231-238, 2003.
Stefan Guthe et al.: High-Quality unstructured Volume Rendering on the PC Platform, Proceedings Graphics Hardware, pp. 119-125, 2002.
Stefan Roettger et al.: Spatialized Transfer Functions, Eurographics—IEEE VGTC Symposium on Visualization, pp. 271-278, 2005.
Weiler M et al: "Hardware-based ray casting for tetrahedral meshes," VIS 2003. IEEE Visualization 2003. Proceedings. Seattle, WA, Oct. 19-24, 2003, [Annual IEEE Conference on Visualization], New York, NY: IEEE (Jan. 1, 2003), pp. 333-340, XP031173516, 001: 10.1109/VISUAL. 2003.1250390 ISBN: 978-0-7803-8120-9, 2003.

* cited by examiner

GENERATION OF A DISPLAY DATA SET WITH VOLUME RENDERING

CROSS-REFERENCE TO RELATED APPLICATION

This application claims priority under 35 U.S.C. §119 to European Patent Application No.: 14198618.2 filed on Dec. 17, 2014, the entire content of which is incorporated herein by reference.

FIELD

A method is provided for generating a display data set through volume rendering. A computing mechanism and computer program are also provided. The method is provided for generating a display data set for depicting a three-dimensional source data set of at least one display parameter through volume rendering. A volume-rendering integral with an integrand, an extinction function that assigns an extinction value for each distance to a value of the display parameter, and a color function that assigns at least one chromaticity for each path to a value of the display parameter is evaluated to determine the display data. The volume-rendering integral is broken down into contributions from third opacities as integrals dependent upon the extinction function and third color coefficients as integrals dependent upon the color function and the extinction function that are each described by a front value and a back value of the display parameter and a desired sampling distance describing the interval used for integration. A computing mechanism and a computer program are also provided.

BACKGROUND

Direct volume rendering with high visual quality has now become a standard precondition for the visualization of three-dimensional medical data sets. The principle of volume rendering is already well known in the prior art. Volume rendering is used to determine a two-dimensional projection, here the display data set, of a three-dimensional source data set, including a display parameter, discretely sampled in voxels. In the medical field, this may entail anatomical parameters (e.g. Hounsfield values in a CT data set). However, other variables, in particular scalar variables, are also conceivable (e.g. variables determined from functional imaging and the like).

Direct volume rendering is based on the premise that each value of the display parameter is projected onto an extinction density and a color density. This act is called classification and uses a transfer function that may be formulated in two parts as an extinction function that projects a value of the display parameter onto an extinction density or opacity density, and a color function that projects a value of the display parameter onto a color density. Since the display parameter is present in discrete voxels, interpolation may be performed before or after the classification in order to obtain the smoothest possible curve over the volume acquired in the three-dimensional source data set. Therefore, either the densities or the display parameter may be interpolated.

Volume rendering processes may be based on a design eye point and a direction of view so that a ray results. The integration of an integrand containing the extinction function and the color function over the ray produces an intensity value describing the reproduction of the corresponding pixel in the display data set. The integral described is known as the volume-rendering integral and, from a mathematical viewpoint, has to be resolved exactly or at least approximately to determine the display data set, either explicitly or implicitly.

In its simplest form, the volume-rendering integral is resolved approximately by discretization using a Riemann sum, wherein the volume of the source data set is sampled along rays and the source data set is used as an input data record in order to determine color density values and extinction density values for the rays. If the sampling distance, and therefore the step size, of the Riemann sum converges toward 0, the discrete approximation also converges toward the exact solution of the volume-rendering integral.

Particularly in medical applications, if possible, the display data sets may be available in real time. Real time availability of the display data sets is difficult when so-called rendering servers are used in order to provide display data sets for multiple users. Therefore, the sampling distances used for approximations of this kind with Riemann sums are rather large. When using the Riemann sum, the resultant direct volume rendering images may display significant discretization artifacts. Although the number of these artifacts drops when the sampling distance is reduced, the sampling distance required to prevent such artifacts is dependent on how quickly the values of the display parameter in the volume change locally and on how quickly the transfer function changes over the value range of the display parameters in the voxels.

Therefore, the sampling distance required to avoid local artifacts is dependent on both the spatial frequencies of changes in the source data set and on the spatial frequencies of the transfer function so that the overall sampling distance required may be understood as a product of these two contributory parts. Therefore, an extremely small sampling distance is required in order to obtain artifact-free display data sets as a resultant images so that the performance of the rendering process on the computing mechanism carrying it out is extremely low. In addition, it is extremely difficult to predict the optimum sampling distance so that no artifacts occur.

To resolve this problem, a pre-integration technique was suggested. Standard publications suggesting pre-integration include the articles by N. Max et al., "Area and volume coherence for efficient visualization of 3d scalar functions", ACM Computer Graphics (Proceedings San Diego Workshop on Volume Visualization 1990) 24, 5 (1990), pages 27-33 (hereinafter Max), S. Röttger et al., "Hardware-accelerated volume and isosurface rendering based on cell-projection", Proceedings IEEE Visualization 2000 (2000), pages 109-116 (hereinafter Röttger1) and K. Engel et al., "High quality pre-integrated volume rendering using hardware accelerated pixel shading", Proceedings Graphics Hardware 2001 (2001), Mark W., Schilling A., (Eds.), ACM Press, pages 9-16 (hereinafter Engel).

Pre-integration enables much higher image quality without having to increase the sampling rate and therefore reduce the sampling distance. A pre-integration table is generated as an n-dimensional table that uses the transfer function, in advance. Therefore, the extinction function and the color function are used as input values. For a linear change between all possible front and back positions of an interval, the volume-rendering integral is solved exactly and stored in the table. During the actual process of volume rendering, the data in the pre-integration table is used instead of the original transfer function because the volume-rendering integral may be broken down into contributions that may be read from the pre-integration table. This approach produces a marked increase in image quality compared to other approaches that calculate the Riemann sum explicitly with larger sampling distances.

Consideration of a one-dimensional transfer function results in a three-dimensional pre-integration table with two dimensions relating to the front and back values of the display parameter for an interval. The integration is performed over the sampling distance. Sampling distance dictates the third dimension storing the step size. However, the need to produce a high-quality three-dimensional pre-integration table for 16-bit volume data places large requirements on the required storage space. Moreover, it is important for a user to be able to change the transfer function interactively. For an high-quality, three-dimensional pre-integration table, interactive changing of the transfer function requires an immense amount of computing capacity and an immense amount of memory space in order to generate the pre-integration table in the desired time.

In cases that the sampling distance is assumed to be constant, the pre-integration table is only two-dimensional. Two-dimensional pre-integration tables are considered to be a practically applicable variable. However, assuming a constant sampling distance may not be possible many specific applications, even for simple cases where volume rendering is performed for an orthographic projection ("orthographic camera").

The difficulty of assuming a constant sampling distance is demonstrated by the example of generating a display data set parts of a ray arriving at or leaving the volume covered by the three-dimensional source data set. Although it would be possible using a constant sampling distance or sampling rate to avoid one of these situations in that the sampling position is moved correspondingly along the ray, it is not conceivable for both boundary points to be treated correctly. Other examples include volume clipping and volume segmentation; both are simple extensions of volume rendering that are frequently used in post-processing applications for the evaluation of the medical data. Without the adaptation of the sampling distance or sampling rate, clearly identifiable rendering artifacts would occur in such situations.

The option of pre-integrated volume rendering with a discretionary sampling distance may be advisable when the actual three-dimensional source data sets are taken into consideration. For example, when trilinear interpolation is performed, the resultant volume is only C∞-constant within a group of eight, trilinearly interpolated voxels, but not on the boundary of the eight voxels where there is only C0-constancy. It would now be particularly advantageous for the sampling positions to be positioned at such C0-boundaries if the interpolated values are approximated along a ray. An approach frequently used for the optimization of performance is adaptive volume rendering. With adaptive volume rendering, the sampling distance may vary in dependence upon local properties.

The ability to use pre-integration with discretionary sampling distances is also extremely advantageous when gradient opacity modulation is to be performed with activated pre-integration. Gradient opacity modulation is a rendering technique enabling the modification of opacity using the local gradient strength during the rendering. Gradient opacity modulation is often used as an additional volume-rendering submode, enabling certain properties to be emphasized in dependence on the gradient strength, e.g. in order to emphasize border regions of tissues.

While the pre-integration technique represents a basic precondition for high-quality direct volume rendering, as yet no optimum algorithm is available in order to implement discretionary sampling distances. Although a few approaches have already been suggested that will be described below, these existing approaches either construe a three-dimensional pre-integration table, entail compromises with respect to the image quality of the display data set, or require a large number of accesses to pre-integration tables that is also disadvantageous with regard to performance on the computing mechanism.

Before a more detailed description of the prior art relating to freely selectable sampling distances with pre-integration, a brief introduction to the basic mathematical formulae for pre-integrated volume rendering is provided to enable better understanding relating to this subject. More detailed information on this subject is made in, for example, the article by M. Kraus and T. Ertl, "Pre-integrated volume rendering", The Visualization Handbook (2004), Hansen C. D. Johnson C. R., (Eds.), Academic Press, pages 211-228 (hereinafter Kraus1).

Let $\tau(s)$ be a scalar function describing the extinction density as a function of the display parameter, s, e.g. the extinction function, and $c(s)\tau(s)$ a scalar function describing a color density ($c(s)$ may also be termed a color function), the volume-rendering integral along a ray parameterized by z in the interval [0,D] is obtained as Equation 1:

$$I = \int_0^D \tau(s(z))(c(s(z))\exp(-\int_0^z \tau(s(t))dt)dz \qquad \text{Eq. 1}$$

where $s(z)$ is a function that assigns an interpolated voxel value of the display parameter to the parameter z.

This well-known integral equation represents the mathematical basis for volume rendering. A volume-rendering implemented as hardware and/or software on a computing mechanism will evaluate this formula as some kind of approximation.

If the interval along the ray is divided into n equidistant parts with a sampling distance $d=D/n$, the opacity $\alpha_i$ and the at least one color coefficient $C_i$ for sub-intervals of the sampling distance, d, may be defined as Equation 2 and Equation 3:

$$\alpha_i = 1 - \exp(-\int_{id}^{(i+1)d} \tau(s(t))dt) \qquad \text{Eq. 2}$$

$$C_i = \int_{id}^{(i+1)d} \tau(s(z))c(s(z))\exp(-\int_{id}^z \tau(s(t))dt)dz \qquad \text{Eq. 3}$$

When these sub-integrals are used, volume-rendering Equation 1 becomes Equation 4:

$$I = \Sigma_{i=0}^{n-1} C_i \Pi_{j=0}^{i-1}(1-\alpha_j) \qquad \text{Eq. 4}$$

This breakdown that is also the basis for a pre-integration technique, wherein in particular the $C_i$ and the $\alpha_i$, the latter also optionally as the transmission $T_i = 1 - \alpha_i$, may provide the pre-integration tables and the same applies for the embodiments described below. Therefore, Equation 4 discloses the breakdown of the volume-rendering integral discussed above.

If, in one interval of the sampling distance, d, the function $s(z)$ is approximated as linear, wherein, the corresponding relationship is determined by, in addition to the sampling distance, d, the front value, sf, and the back value, sb, of the display parameter specified by $s(z)$, Equations 2 and 3 may be approximated as Equation 5 and 6:

$$\alpha_i \approx 1 - \exp(-\int_0^1 \tau((1-\omega)s_f + \omega s_b)d d\omega) \qquad \text{Eq. 5}$$

$$C_i \approx \int_0^1 \tau((1-\omega)s_f + \omega s_b)c((1-\omega)s_f + \omega s_b)\exp(-\int_0^\omega \tau((1-t)s_f + ts_b)d dt)d d\omega \qquad \text{Eq. 6}$$

The problem-free transition to the integration variable $\omega$ enabled by the assumption of linearity results in an interval distance in Equations 5 and 6 that is no longer d but 1.

Equation 5 and Equation 6 are now only dependent on three parameters, namely the front value, sf, and back value, sb, of a sub-interval and on the sampling distance, d, of the sub-interval. If a three-dimensional pre-integration table is generated for all possible constellations of α(sf, sb, d) and C(sf, sb, d), the volume-rendering integral may be approximated by Equation 4, retrieving the corresponding opacities and color coefficients from the pre-integration table. Therefore, there is a breakdown into the sub-intervals that defines d, the values for sf and sb are determined at the sampling positions and the pre-integration table may be used.

Pre-integration may be considered an important contribution in volume rendering because resultant image quality of the display data set for a given sampling rate may be significantly increased compared to other approaches while the algorithm remains simple and quick as long as the pre-integration table is available. Without pre-integration, the high sampling rate required in order to prevent rendering artifacts would quickly result in performance problems for non-linear transfer functions. Accordingly, pre-integrated volume rendering used by virtually all volume-rendering providing high quality in computing mechanisms that are able to provide new display data sets in real time with interactive frame rates.

The publication on pre-integration by Röttger1, suggests an approach generating a three-dimensional pre-integration table and using three-dimensional texture hardware in order to save the pre-integration table. The pre-integration table is thus made available for inquiries. However, in many cases, a three-dimensional table of this kind may not be used in practice since high requirements are placed on the corresponding storage mechanism, and a long time or a high computing capacity is required in order to update the table. Therefore, the prior art has already suggested approaches that directly or indirectly avoid three-dimensional pre-integration tables and nevertheless may enable freely selectable sampling distances.

One category of approaches avoiding the use of three-dimensional pre-integration tables is the restriction of transfer functions to cases where the resultant integrals of the volume-rendering equation may be treated analytically. For example, in "Gaussian transfer functions for multi-field volume visualizations", Proceedings Visualization 2003 (2003), pages 497-504, (hereinafter Kniss). Kniss suggested special transfer functions based on Gaussian functions. However, since approaches of this kind are not possible for general transfer functions, they are of less interest.

Engel suggests that Equation 5 and Equation 6 are approximated using one-dimensional integral functions. For the approximation of Equation 6, they suggested the use of an integral function that ignores the self-attenuation term resulting in a much simpler integrand, but this is based on the assumption that the expression τ(s)*d is very small. Another approximation that uses integral functions but makes fewer assumptions was suggested in a publication by M. Kraus, "Pre-integrated Volume Rendering for Multi-Dimensional Transfer Functions", IEEE/EG Symposium on Volume and Point-Based Graphics, H.-C. Hege, D. Laidlaw, R. Pajarola, O. Staat, (Eds.), pages 1-8, 2008 (hereinafter Kraus2). In this publication, self-attenuation is not ignored but is also taken into account. This enabled the approximation to be reduced for general transfer functions and greater sampling distances.

The approach suggested by Engel, that the volume-rendering equation be simplified with the aid of integral functions, was originally suggested in order to accelerate the calculation of two-dimensional pre-integration tables and was later extended by Kraus in order to approximate pre-integrations for multidimensional transfer functions as well. While, therefore, the original purpose was not to deal with the case of discretionary sampling distances, these approaches are still suitable for the approximation of this case as well since the sampling distance, d, appears as an independent parameter in their equations that approximate the color coefficients using integral functions.

Problematically, the use of such approaches with integral functions is subject to limitations. For example, it is permissible to assume that the extinction density may be infinitely large such that the ray reaches full opacity directly when a point of this type is reached. In such a case, a one-dimensional integral function would not work well since the integral function is no longer able to reproduce opacity changes that occur after such a point of infinite opacity. Then, approaches with integral functions may only be used to a restricted degree if extremely high quality approximations are required.

In the following, let $\alpha_i$ and Ci be the opacities and color coefficients for a sampling distance, d, and $\alpha_i'$ and $C_i'$ the opacities and color coefficients for the same front and back values but relating to a different sampling distance, d'. A category of algorithms is known use a two-dimensional pre-integration table providing C(sf, sb, d) and $\alpha_i$(sf, sb, d) for the sampling distance, d. The values C' and α' are to be determined for another discretionary sampling distance d' but still from the two-dimensional pre-integration table. Examples algorithms are provided in the publications by S. Röttger et al., "Smart Hardware-Accelerated Volume Rendering", Proceedings of EG/IEEE TCVG Symposium on Visualization VisSym '03 (2003), pages 231-238 (hereinafter Röttger2), and J. P. Schulze et al., Integrating pre-integration into the shear-warp algorithm", Proceedings Volume Graphics 2003 (2003), pages 109-118 (hereinafter Schulze).

It is useful that the calculation of the opacity coefficient $\alpha_i'$ may be performed without an approximation, because the relationship expressed in Equation 7:

$$1-\alpha_i'=(1-\alpha_i)^{d'/d} \qquad \text{Eq. 7}$$

is applicable between $\alpha_i$ and $\alpha_i'$ (see e.g., Röttger2). Unfortunately, there is no corresponding relationship for the color coefficients. A coarse estimation ignoring self-attenuation was disclosed in Röttger1 by Equation 8:

$$C_i' \approx C_i \frac{d'}{d} \qquad \text{Eq. 8}$$

If Equation 8 is used to calculate color coefficients for other sampling distances, d', strong artifacts occur in conjunction with a darkening of the colors in the display data set. For this reason, a mathematical equation was derived in Schulze that is more suitable for approximating the correct color coefficients. The Schulze equation considers the special case of a volume-rendering integral with constant extinction density and the color density. If the solution of this special case is used as an approximation of the general case, the following approximation is obtained as Equation 9:

$$C_i' \approx C_i \frac{\alpha_i'}{\alpha_i} = C_i \frac{1-(1-\alpha_i)^{d'/d}}{1-(1-\alpha_i)} \qquad \text{Eq. 9}$$

for the case when $\alpha_i$ is unequal to zero and the equality does not apply for general color and extinction functions. If $\alpha_i$ is equal to zero, the application of L'Hospital's rule to Equation 9 again results in Equation 8.

The advantageous feature of this approach is that the general pre-integration case for discretionary sampling distances is approximated by an algorithm that only requires a two-dimensional pre-integration table instead of a three-dimensional pre-integration table. However, this simple embodiment has drawbacks. The use of this approach entails the occurrence of a wide variety of rendering artifacts, in particular in regions where the opacity is high. This is due to the fact that this approach is only an approximation for the case of general color and extinction functions.

There is an interesting relationship between the approaches that use an integral function and the correction Equation 8 and Equation 9. The approximations for the color coefficients that are based on the integral functions, may also be used to derive equations permitting the calculation of opacities and color coefficients for a second sampling distance from opacities and color coefficients for a first sampling distance. The use of the integral formulae of Engel, obtains the color coefficients for Equation 8, while Krauss2 results in Equation 9.

A publication by Guthe et al., "High-quality unstructured volume rendering on the PC platform", Proceedings Graphics Hardware 2002 (2002), pages 119-125 (hereinafter Guthe), disclosed an algorithm permitting high-quality color correction for general sampling distances. This algorithm utilizes the fact that one single pre-integration table is not sufficient to achieve high-quality correction of the color coefficients for different sampling distances. Guthe suggests the calculation of several pre-integration tables for normalized chromaticity $C_i/\alpha_i$ for different fixed sampling distances and the approximation of the case of general sampling distances d' by the use of an interpolation polynomial and scaling with the corrected opacity $\alpha_i$. Thus, the approximation of the color coefficients for the sampling distance d' requires the generation of n two-dimensional pre-integration tables for normalized chromaticity for different sampling distances and the retrieval of values from all these n tables in order to interpolate them with a polynomial of the degree (n−1). The result is then scaled with the opacity $\alpha'$ that, according to the other approaches, may be calculated directly by using Equation 7.

According to Guthe, the minimum n requiring this approach in order to achieve a good approximation quality is at least n=3 that is, at least three pre-integration tables have to be generated and, with volume rendering, it is necessary to make retrievals from all the tables and perform interpolation. A further increase of n further increases the mathematical quality of the numerical approximation, wherein, however, there is a simultaneous increase in the number of pre-integration tables required and the number of accesses to the tables.

Since according to Guthe, the normalized chromaticity is interpolated and the result corrected with the corrected opacity $\alpha'$, this approach may be considered to be an extension of the approach according to Schulze with the latter being understood as the trivial case n=1. In this case, only the normalized chromaticity for the sampling distance d would be corrected with the corrected opacity, $\alpha'$, resulting directly in Equation 9.

To summarize, at the present time at least three color integration tables are required in order to determine high-quality color coefficients for the case of general sampling distances, placing high requirements on storage space and access possibilities for the tables. A large degree of effort is required to determine the tables and provides further room for improvement with respect to quality.

SUMMARY AND DESCRIPTION

An object is to provide a method for volume rendering with pre-integration permitting a higher quality of the display data set with a less complex and/or quicker calculation.

In one embodiment of the method, acts are performed for the evaluation of the volume-rendering integral. The method includes, on the basis of a subdivision of the integration distance specified with respect to a fixed predetermined target sampling distance that is independent of the desired sampling distance into at least two subsections described by at least one subdivision parameter, provision of a number that corresponds to the number of subsections, of pre-integration tables, having at least the number minus one relate to integrations over different subsections. A front value and a back value of the display parameter are assigned a target sampling distance opacity to be used to calculate a contribution of the volume-rendering integral and at least one target sampling distance color coefficient. The method further includes, for each contribution of the volume-rendering integral, determination of the target sampling distance opacities and the target sampling distance color coefficients from the pre-integration tables and calculation of the third opacities converted to the desired sampling distance from the respective target sampling distance opacities and the ratio of desired sampling distance and target sampling distance and the third color coefficients from the target sampling distance opacities, the target sampling distance color coefficients and the ratio of desired sampling distance and target sampling distance. The method also includes determination of the volume-rendering integral from the contributions.

Specifically, during this, the third opacities are calculated according to Equation 7 and the third color coefficients are calculated according to the newly developed formula within the scope of the present embodiments (or, derivatives of this formula) provided as Equation 10:

$$C'(0,1) = \sum_{i=0}^{n} C(\lambda_i, \lambda_{i+1}) \frac{1 - T(\lambda_i, \lambda_{i+1})^x}{1 - T(\lambda_i, \lambda_{i+1})} \prod_{j=0}^{i-1} T(\lambda_j, \lambda_{j+1})^x \qquad \text{Eq. 10}$$

where $\alpha'(0,1)$ designates the third opacity over the entire integration distance of 0 to 1, $\alpha(0,1)$ designates the opacity also optionally available as the target sampling distance for the entire integration distance of 0 to 1 for the target sampling distance, $C'(0,1)$ designates the third color coefficients over the entire integration distance of 0 to 1, $\lambda_i$ designates numbers as subdivision parameters satisfying $0 \leq \lambda_1 \leq \lambda_2 \leq \ldots \leq \lambda_n \leq 1$ with the convention that $\lambda_0 = 0$ and $\lambda_{n+1} = 1$, $C(\lambda_i, \lambda_{i+1})$ designates the target sampling distance color coefficients for the subsection between $\lambda_i$ and $\lambda_{i+1}$.

$T(\lambda_i, \lambda_{i+1}) = 1 - \alpha(\lambda_i, \lambda_{i+1})$ designates the target sampling distance transparency for the subsection between $\lambda_i$ and $\lambda_{i+1}$, where $\alpha(\lambda_i, \lambda_{i+1})$ is the corresponding target sampling distance opacities, and $$x = \frac{d'}{d}$$

designates the ratio of the desired sampling distance, d', to the target sampling distance, d.

Since the relationships of Equation 28 and Equation 29 apply, the target sampling distance color coefficients C(0,1) and the target sampling distance transparencies T(0,1) and hence opacities α(0,1) may be introduced without problems.

An embodiment provides that, as the pre-integration tables, a first pre-integration table with first opacities and first color coefficients is determined, the integrals that were evaluated over the entire integration distance and the number minus one is determined on second pre-integration tables with second opacities and second color coefficients having integrals that were evaluated for one of the first number minus one subsections, wherein the third opacities are obtained from the first opacities and the ratio of desired sampling distance and target sampling distance and the third color coefficients from the first and second opacities, the first and second color coefficients and the ratio of desired sampling distance and target sampling distance. In this case, therefore, the target sampling distance opacities and color coefficients are classified as first and second opacities or color coefficients. This results in marked advantages in present embodiments if the first pre-integration table may be calculated first and is available during the calculation of the second pre-integration table(s) and this will be dealt with in more detail below. Reference is made to fact that obviously the respective "missing" variables may be determined without problems due to the linearity of the integrals (and optionally also due to other relationships), e.g. for example a variable for a subsection from the corresponding first variable and the second variables for all other subsections, as already indicated above with respect to Equation 10.

For purposes of simplicity and since the exemplary embodiments described below may use one first and at least one second pre-integration table, the following explanations are intended, without restricting the generality, to relate to target sampling distance opacities and target sampling distance color coefficients that are present as first and second opacities and first and second color coefficients.

Therefore, embodiments are provided based on a subdivision of the integration interval defined by the integration distance for the integrals that form the base for the opacities and the color coefficients are based. The embodiments enable a markedly improved approximation for color coefficients of other sampling distances, providing an improved quality of the display data set results. If the integration distance is broken down into two subsections, it is particularly advantageous and sufficient to use only two, two-dimensional pre-integration tables, greatly reducing the effort required for calculating the pre-integration tables, storing the pre-integration tables, and accessing the pre-integration tables. The actual process of volume rendering achieving improved implementation in real time for the majority of computing mechanisms with the method implemented in hardware and/or software. An underlying motivation is to check whether high-quality generation of a display data set is possible from not two pre-integration tables that are both two-dimensional. The disclosed approach described may be expanded in order by using more than two pre-integration tables. A further improvement in the image quality may be achieved. Approaches using two-dimensional color integration tables also provides improvement compared to approaches such as Guthe, in particular when the subdivision parameters are determined on the basis of an optimization.

At this point, a general reference is made to the fact that the subdivision parameter for the individual entries in the second pre-integration table(s) does not mandatorily have to be the same and this will also be dealt with in more detail below. The subdivision parameter or the determination thereof, in particular in the case of optimization, is only implicitly included in the second opacities and color coefficients there.

Motivating the present embodiments and deriving the formulae used, the Schulze approach will be subjected to a further more detailed examination.

Consider the volume-rendering integral, Equation 1 that may also be approximated by the present embodiments, for the case of a discretionary τ(s) and a constant color function c(s)=c. The volume-rendering integral over an interval [a,b] is then provided by Equation 1a:

$$I = c \int_a^b \tau(s(z)) \exp(-\int_a^z \tau(s(t)) dt) dz \qquad \text{Eq. 1a}$$

Let us now assume that the function s(z) is a linear function. As in Max, the integral may be solved analytically using the chain rule that results in a simple equation with respect to the color coefficients $C_i$ and the opacities $\alpha_i$ provided by Equation 11:

$$C_i = c\alpha_i \qquad \text{Eq. 11}$$

Now, an analysis of the opacities and color coefficients for a sampling distance, d, and a sampling distance, d', and the use of Equation 7 result in Equation 12:

$$C_i' = c\alpha_i' = C_i \frac{\alpha_i'}{\alpha_i} = C_i \frac{1-(1-\alpha_i)^{d'/d}}{1-(1-\alpha_i)} \qquad \text{Eq. 12}$$

This corresponds to Equation 9, wherein the only assumption made was that c(s) is constant, but $\alpha_i$ is freely selectable. However, Schultze derivation of Equation 9 assumes that the color function and the opacity function are constant.

The important consequence of these considerations is that, when Equation 9 is applied as an approximation for the correction of the color coefficients, correct results are provided not only for constant color function and constant extinction function, but also for the much broader class of cases where only the color function is constant but the extinction function is a discretionary function. Therefore, the correction Equation 9 is used as an important building block of the further motivated approach according to the embodiments described below.

Before the details thereof are described more precisely, it is necessary to explain a few of the underlying ideas. If the approach described in Schulze is used for the determination of color coefficients $C_i'$ with a sampling distance, d', from the opacities and color coefficients for a sampling distance, d, using Equation 9, the result is an algorithm that is simple, but does not provide sufficiently good image quality. For example, it is assumed that the opacity within the integration distance starts with a transparent value for color A and is later completely opaque, to be precise, with another color B. In such a situation, Equation 9 would produce results where $C_i' = C_i$ does not take account of the transparent contributions based on the color A.

Therefore, additional information is missing providing details of how the underlying transfer function responds and does not only take account of absolute values $\alpha_i$ and $C_i$. However, to arrive at a practically applicable method, it is important to keep the storage space for the additional Information as small as possible in order to minimize the resultant amount of input data. Therefore, the starting point for the disclosed embodiments was a search for the best additional information that may be held in the smallest possible data memory. From a mathematical viewpoint, the words "best information" is defined as an extreme solution is sought for a metric that prefers solutions with maximum information content.

The solution described in Guthe also uses additional information but requires three pre-integration tables as input in order to achieve high-quality results. While the disclosed embodiments are also directed at improving overall quality, there is particular interest in the question as to the degree to which approximation quality is possible if only two pre-integration tables are used. Therefore, an embodiment is considered that permits the use of only two pre-integration tables, e.g., the first pre-integration table and only one second pre-integration table. It has unexpectedly been found that this approach with only two pre-integration tables already achieves a high image quality in contrast to the resultant image quality according to Guthe when only two pre-integration tables are used.

A further precondition observed when additional information is used is that the resultant algorithm maintains the advantageous feature that Equation 9 already provides the correct result for a large proportion of the transfer functions. Mathematically, such a feature of an algorithm is understood as "consistency" e.g., an interpolation algorithm may be consistent if the same result is obtained when the given set of interpolation points is expanded by a new point on the interpolated curve.

The following now provides an illustrative description of one case of the present embodiments, wherein generalization will be dealt with later. In this case, as already addressed, only two subsections of the integration distance are used. It will also be assumed that there is a linear approximation of the function s(z) within the target sampling distance, wherein the approach may also be transferred to other approaches for the mapping function s(z), e.g., quadratic approaches or the like.

It may be assumed that there is a generalization of Equation 5 and Equation 6 in that they are not defined over the interval [0,1], but over a generalized interval [$\lambda_1, \lambda_2$] resulting in the following Equation 13 and Equation 14.

$$\alpha(\lambda_1,\lambda_2)=1-\exp(-\int_{\lambda_1}^{\lambda_2}\tau((1-\omega)s_f+\omega s_b)dd\omega) \qquad \text{Eq. 13}$$

$$C(\lambda_1,\lambda_2)=\int_{\lambda_1}^{\lambda_2}\tau((1-\omega)s_f+\omega s_b)c((1-\omega)s_f+\omega s_b)\exp(-\int_{\lambda_1}^{\omega}\tau((1-t)s_f+ts_b)ddt)dd\omega \qquad \text{Eq. 14}$$

Therefore, Equation 5 and Equation 6 are special cases where $\lambda_1=0$ and $\lambda_2=1$.

Assume that $\lambda_1$ is a number satisfying $0 \le \lambda_1 \le 1$ and further define the transparency for an interval as provided by Equation 15:

$$T(\lambda_1,\lambda_2)=1-\alpha(\lambda_1,\lambda_2) \qquad \text{Eq. 15}$$

It is now assumed that the integration distance [0,1] is divided into two subsections described by the subdivision parameter $\lambda_1$. Then, the following Equation 16 and Equation 17 describe the relationship between the color coefficients and the opacities of the subsections [0, $\lambda_1$] and [$\lambda_1$, 1] with the (first) color coefficients and (first) opacities of the total interval [0,1] as Equation 16:

$$T(0,1)=T(0,\lambda_1)*T(\lambda_1,1) \qquad \text{Eq. 16}$$

$$C(0,1)=C(0,\lambda_1)+T(0,\lambda_1)C(\lambda_1,1) \qquad \text{Eq. 17}$$

In this case, Equation 17 is a consequence of Equation 4 for general sub-intervals.

Now, let T and C designate the pre-integrated transparencies and color coefficients for the target sampling distance, d, and T' and C' the corresponding values for a desired sampling distance, d'. Then, due to Equation 17, the color coefficient C'(0,1) satisfies the following Equation 18:

$$C'(0,1)=C'(0,\lambda_1)+T'(0,\lambda_1)C'(\lambda_1,1) \qquad \text{Eq. 18}$$

The following will now utilize the convention of Equation 19:

$$x=\frac{d'}{d} \qquad \text{Eq. 19}$$

describes the ratio between the sampling distances. The correction Equation 9 may now be applied to each of the subsections [0, $\lambda_1$] and [$\lambda_1$, 1] instead of the full integration distance [0, 1] in order to approximate C'(0, $\lambda_1$) and C'($\lambda_1$, 1) in Equation 18. If Equation 7 is used to replace T'(0, $\lambda_1$), the following approximation is achieved for the (ultimately sought) color coefficients C'(0,1) as Equation 20:

$$C'(0,1) \approx C(0,\lambda_1)\frac{1-T(0,\lambda_1)^x}{1-T(0,\lambda_1)} + C(\lambda_1,1)T(0,\lambda_1)^x\frac{1-T(\lambda_1,1)^x}{1-T(\lambda_1,1)} \qquad \text{Eq. 20}$$

Now, the use of Equation 16 and Equation 17 enables T($\lambda_1$, 1) and C($\lambda_1$, 1) to be replaced and produces Equation 21:

$$C'(0,1) \approx \qquad \text{Eq. 21}$$
$$C(0,\lambda_1)\frac{1-T(0,\lambda_1)^x}{1-T(0,\lambda_1)} + (C(0,1)-C(0,\lambda_1))\frac{T(0,\lambda_1)^x-T(0,1)^x}{T(0,\lambda_1)-T(0,1)}$$

Equation 20 ultimately represents the special case of Equation 10 for a subdivision of the integration distance into two subsections, wherein in Equation 21, the coefficients for the entire integration distance [0,1] were introduced through Equation 16 and Equation 17 (in this regard, also see below for the general case Equation 28 and Equation 29. The integration distance is advantageously broken down into precisely two subsections, with one second pre-integration table relating to the first subsection and the third color coefficients calculated according to Equation 21. C(0, $\lambda_1$) and $\alpha$(0, $\lambda_1$) therefore represent the second color coefficients and the second opacities, wherein, due to the simple relationship provided by Equation 15, it is immaterial whether the opacities are stored directly or indirectly as transparencies.

Equation 21 is definitely exactly for the special case, where the color function is a piecewise constant function that is in each case constant in the intervals [0, $\lambda_1$] and [$\lambda_1$, 1]. The extinction function may be discretionary. General color functions, (21) are considered to be an approximation.

The quality of the approximation depends upon the choice of the division parameter $\lambda_1$. Although it is in principle conceivable for the division parameter $\lambda_1$ to be assigned a fixed value, e.g., 0.5, this is less preferable. Since namely $\lambda_1$ represents a degree of freedom and is freely selectable, it is advisable to make the optimal choice, e.g. to use the value of $\lambda_1$ that provides the best approximation.

Therefore, one embodiment of volume rendering provides that the at least one subdivision parameter is determined in an optimization method targeted at the minimization of the interval between third color coefficients for a desired sampling distance determined by exact integration and third color coefficients for the desired sampling distance determined from target sampling opacities, e.g., first and second opacities, target sampling distance color coefficients, and first and second color coefficients for the target sampling distance. It has been found that a choice optimized in this way that may also be made differently for different entries in the at least one second pre-integration table, may achieve another dramatic improvement in the resulting image quality of the two-dimensional display data set, even with the use of only two pre-integration tables and therefore the specific explanations again relate to this particularly advantageous case.

Let $C(s_f, s_b, d')$ be the exact, e.g., pre-integrated, color coefficient for front and back values $s_f$, $s_b$, e.g., an entry in the pre-integration tables, and a sampling distance, d', and C'(0, 1) the associated approximation according to Equation 21. Then, the idea behind the optimization methods is to select the division parameter $\lambda_1$ such that the term of Equation 22:

$$|C(s_f, s_b, d') - C'(0,1)| \quad \text{Eq. 22}$$

together with Equation 21 produces Equation 23:

$$\left| C(s_f, s_b, d') - \left( C(0, \lambda_1) \frac{1 - T(0, \lambda_1)^x}{1 - T(0, \lambda_1)} + (C(0, 1) - C(0, \lambda_1)) \frac{T(0, \lambda_1)^x - T(0, 1)^x}{T(0, \lambda_1) - T(0, 1)} \right) \right| \quad \text{Eq. 23}$$

is minimal. In this form, the minimization problem depends upon the selected ratio, x, between the sampling distances d', d. However, it was established in investigations that the selected ratio for the sampling distances does not have a sizeable influence on the result of the quality of the approximation so that it is advantageously possible to provide a fixed value for x, e.g., 0.5, since the power functions are then reduced to simple radicands that may be efficiently evaluated by the majority of computing mechanisms.

In other words, it is therefore expediently provided that the ratio, x, between desired sampling distance and target sampling distance is fixed in advance for the optimization method, in particular 0.5.

For x=0.5, Equation 21 becomes Equation 24:

$$C'(0, 1) \approx \frac{C(0, \lambda_1)}{1 + \sqrt{T(0, \lambda_1)}} + \frac{(C(0, 1) - C(0, \lambda_1))}{\sqrt{T(0, \lambda_1)} + \sqrt{T(0, 1)}} \quad \text{Eq. 24}$$

and the optimization Equation 23 becomes Equation 25:

$$\left| C(s_f, s_b, 0.5 d) - \left( \frac{C(0, \lambda_1)}{1 + \sqrt{T(0, \lambda_1)}} + \frac{(C(0, 1) - C(0, \lambda_1))}{\sqrt{T(0, \lambda_1)} + \sqrt{T(0, 1)}} \right) \right| \quad \text{Eq. 25}$$

Although possible, it is less preferable to determine a further pre-integration table for the performance of the optimization method for x=0.5, since this table is required for optimization with Equation 25, because there is a solution that greatly simplifies the optimization.

In Equation 25, the term $C(s_f, s_b, 0.5d)$ is not dependent on the subdivision parameter $\lambda_1$ (in the further case of second subsections considered for purposes of simplicity). The expression in the magnitude lines in Equation 25 is greater than zero; thus, in principle the maximum of the expression in the magnitude lines is sought. Therefore, if the curve described by the expression in the magnitude lines as above, $C(s_f, s_b, 0.5d)$ is no longer relevant, and the problem is reduced to a simple search for a maximum. Therefore, if a function provided as Equation 26:

$$f(\lambda_1) = \left| \frac{C(0, \lambda_1)}{1 + \sqrt{T(0, \lambda_1)}} + \frac{(C(0, 1) - C(0, \lambda_1))}{\sqrt{T(0, \lambda_1)} + \sqrt{T(0, 1)}} - \frac{C(0, 1)}{1 + \sqrt{T(0, 1)}} \right| \quad \text{Eq. 26}$$

is defined with $f(\lambda_1)=0$ for $\lambda_1=0$ and $\lambda_1=1$ and may be maximized as a target function in the optimization method. The calculation of the pre-integration tables may then be simplified. In other words, a target function is maximized and is positive due to displacement and defined with the omission of the third color coefficients that are independent of the subdivision parameter and determined by integration.

This embodiment permits a particularly simple determination of the pre-integration tables. Prior to the determination of the optimization methods, the first pre-integration table is determined. Using integrals from the first pre-integration table, the optimization method is performed during the numerical integration for the determination of at least one second pre-integration table. After each part-act of the numerical integration, a check is performed to determine whether a new extreme value has been found for the integrals. If there is a new extreme value, these integrals are stored so that, once the entire integration distance has been passed through, the integrals corresponding to the extreme value are stored in the at least one second pre-integration table. Therefore, the first pre-integration table is determined. During determination of the at least one second pre-integration table, a slightly modified pre-integration algorithm is performed using progressive numerical integration, e.g. determining the integrals via increasing partial sums while passing through integration distance [0, 1]. Each of these pre-integration acts contains interim results for specific subdivision parameters. Interim results are used together with the existing present values in the first pre-integration table in order to check whether the target function $f(\lambda_1)$ reaches a new maximum. If a new maximum is reached, the current integral values, in conjunction with the associated target function value, optionally overwriting any earlier entries, are stored and continued until the integration distance has been passed through. The integral values stored then are then adopted for this pair of $s_f$, $s_b$ in the second pre-integration table.

At least in this embodiment, the complexity of the resultant algorithm is comparable with the object of calculating two, two-dimensional pre-integration tables, since it is simple to integrate the optimization problem in a usual pre-integration algorithm that was developed for massively parallel computing hardware on a computing mechanism and already calculates partial opacities and the partial color efficient in Equation 26. The evaluation of the Equation 26 is not particularly demanding from a mathematical viewpoint and, in cases with x=0.5, the evaluation only requires one single non-constant root operation (root of $t(0, \lambda_1)$) that may be carried out efficiently on modern computing units (CPUs) as well as GPUs.

If this optimization process were applied to the (usual) case considering three colors (RGB), three color coefficients are stored in the second pre-integration table, namely for red, green and blue. Three different opacity values are also stored for red, green and blue. The optimum for the target function, see e.g., Equation 26, is determined independently for each color and, therefore, different division parameters may emerge for each color. However, this would be undesirable since six values would be stored, not four, as would be required by the usual RGBA memory form. The optimization problem is solved three times, once for each color channel $C_R$ (0, $\lambda_1$), $C_G$ (0, $\lambda_1$), and $C_B$ (0, $\lambda_1$) for a single segmentation parameter.

In order to avoid this problem, simplify the method still further, and reduce the storage space required, a one embodiment provides that when several colors with assigned color functions are used, the optimization method is performed for all colors simultaneously. A target function is obtained as the sum of the target functions of the individual colors so that a common optimum subdivision parameter is found for all colors, and therefore a common target sampling distance opacity on integration over subsections for all colors, in particular therefore a common second opacity for all colors.

Therefore, for the RGB case using the single color target function in Equation 26, the following would be obtained as a new target function provided as Equation 27:

$$f_R(\lambda_1) + f_G(\lambda_1) + f_B(\lambda_1) \qquad \text{Eq. 27}$$

where $f_R$, $f_G$, and $f_B$ are the single color target functions, Equation 26, for the red, green and blue channels. The resultant optimum division parameter $\lambda_{opt}$ is then applied to all three color channels $C_R$ (0,$\lambda_{opt}$), $C_G$ (0, $\lambda_{opt}$), and $C_B$ (0, $\lambda_{opt}$). To summarize, two RGBA pre-integration tables are stored with the first containing the values [$C_R$ (0, 1), $C_G$ (0,1), $C_B$ (0,1), $\alpha$(0,1)] and the second containing the values resulting from the solution of the optimization problem [$C_R$ (0, $\lambda_{opt}$), $C_G$ (0, $\lambda_{opt}$), $C_B$ (0, $\lambda_{opt}$), $\alpha$(0, $\lambda_{opt}$)].

The embodiments for the determination of the pre-integration tables are independent of a specific rendering task for a specific source data set. Therefore, there, the term 'desired sampling distance' may not be limited as relating to a specific source data set but as a discretionary sampling distance different from the target sampling distance that is representative of the desired convertibility to discretionary sampling distances. Correspondingly, the term 'third color coefficients' as used herein, encompasses its plain and ordinary meaning, including, but not limited to the color coefficients of this sampling distance that differs from the target sampling distance.

Since the derivations relate to the case of two pre-integration tables, we will now briefly address the basis of the general case with Equation 10 dividing the integration distance into a discretionary number of subsections, e.g. any number of subdivision parameters $\lambda_i$ may be provided.

As subdivision parameters, let $\lambda_1, \lambda_2, \ldots, \lambda_n$ be ordered numbers satisfying $0 \leq \lambda_1 \leq \lambda_2 \leq \ldots \leq \lambda_n \leq 1$, Equation 16 and Equation 17 may then be generalized to obtain Equation 28:

$$T(0,1) = T(0,\lambda_1) * T(\lambda_1,\lambda_2) * \ldots T(\lambda_n,1) \qquad \text{Eq. 28}$$

and Equation 29:

$$C(0,1) = \Sigma_{i=0}^n C(\lambda_i,\lambda_{i+1}) \Pi_{j=0}^{i-1} T(\lambda_j,\lambda_{j+1}) \qquad \text{Eq. 29}$$

when the naming convention $\lambda_0 = 0$ and $\lambda_{n+1} = 1$ is used as already indicated above.

As an analog Equation 21 describing how C'(0,1) may be approximated, Equation 10 may be derived analogously for general cases. The minimization problem given by Equation 25 and the maximization problem given by Equation 26 may also be formulated completely analogously, but with a multidimensional optimization problem. As an analog to Equation 25, the following Equation 30 is obtained for the minimization problem:

$$\left| C(s_f, s_b, 0.5d) - \left( \sum_{i=0}^n C(\lambda_i, \lambda_{i+1}) \frac{1}{1+\sqrt{T(\lambda_i,\lambda_{i+1})}} \prod_{j=0}^{i-1} \sqrt{T(\lambda_j,\lambda_{j+1})} \right) \right| \qquad \text{Eq. 30}$$

As a result of this general scenario, it is possible to formulate an algorithm that uses (n+1) two-dimensional pre-integration tables, namely the first pre-integration table containing pre-integrated values for the opacity and the color coefficients over the entire integration distance for a sampling distance, d, the target sampling distance. This may be used over Equation 28 and Equation 29 which introduce the opacity and the color coefficients for the entire integration distance [0, 1]. This is then followed by the use of n further second pre-integration tables containing the color integration results for subsections, e.g. for the opacity $\alpha(\lambda j, \lambda j+1)$ and $C(\lambda j, \lambda j+1)$ that are assigned to the subdivision parameters, $\lambda$, that may be found as a solution to the optimization methods. The RGB color case may be implemented analogously to the simple case described, where n=1 was selected.

As an aside, it is established that for the theoretical case n=0, the approach of Schulze is achieved. While, therefore, the approach to the generation of high-quality color-coefficient approximations is completely different from the approach in Guthe, in their trivial form, both are simplified to the approach of Schulze.

A variant of direct volume rendering is gradient opacity modulation.

In this case, in the volume-rendering integral given by Equation 1, the extinction density function $\tau(s)$ is modulated during the rendering with a function, f, that depends upon the gradient strength in the source data set such that the modulated extinction function $\tau(s)$ then may be given by Equation 31:

$$\tau(s) \to f(|\nabla s(x)|)\tau(s) \qquad \text{Eq. 31}$$

If pre-integrated volume rendering is now used, theoretically, this modulation would use a five-dimensional pre-integration table for the case of general sampling distances, since additional front and back values for the function, $f$, in Equation 31 may be considered. In S. Röttger et al., "Spatialized Transfer functions", EuroVis 2005, pages 271-278, hereinafter Röttger3, this pre-integration table may be reduced by one dimension if it is assumed that the gradient remains approximately constant within an interval that considers the possibility that frequencies of the function, $f$, as in Equation 31, may be much lower than the frequencies resulting from the color distribution of the transfer function.

An analysis of Equation 5 and Equation 6 in the case of gradient opacity modulation establishes that the resultant equations are extremely similar to the case of general sampling distances, wherein the sole difference is that the factor, d, is replaced by $df(|\nabla s(x)|)$.

However, the gradient modulation scenario may be reduced to the regular pre-integration scenario when the modulation factor is combined with the target sampling distance. Further reduction of the remaining four-dimensional case to the three-dimensional case may then be made. In some embodiments, only two, two-dimensional pre-integration tables are required. Therefore, an advantage is provided when using a modulated extinction function for the volume-rendering integral, dependent upon the amount of the three-dimensional gradient of the display parameter. During modulation evaluation, the modulation factor is applied to the ratio of desired sampling distance to target sampling distance. Accordingly, instead of the ratio of desired sampling distance to target sampling distance, the ratio of desired sampling distance to target sampling distance is multiplied with the modulation factor.

Since the modulation function, $f$, for the integration distance is assumed to be constant, it therefore corresponds to a modulation factor. In formulae, instead of Equation 19, it is now defined as Equation 32:

$$x = \frac{d'}{d} f(|\nabla s(x)|) \qquad \text{Eq. 32}$$

Using gradient opacity modulation, it is possible to derive further improvements in volume rendering. When the extinction function according to Equation 31 is modulated, the modulating function (or therefore the modulation factor) rapidly approaches zero, when relatively homogeneous regions with low gradient amplitudes are considered. However, at the same time, x according to Equation 32 also rapidly approaches zero so that approximations may be performed, simplifying calculations, at least, in regions where low values for x occur. In the other regions, the volume rendering integrals are still evaluated as described above by calculation according to Equation 4 using Equation 7, Equation 10, or Equation 21 for the desired sampling distance, d', using the first and at least one second pre-integration table.

However, if x approaches zero, the power functions that occur may be approximated. The value of x may be determined through a checking process during the shading upstream (in compositing) of the volume rendering integral evaluation. Since $T_x$ may also be described as exp(x*ln(T)), a Taylor series of the exponential function exp( ) produces Equation 33:

$$T^x \approx 1 + x^* \ln(T) \qquad \text{Eq. 33}$$

when the term x*ln(T) is close to zero. This equation may be evaluated more quickly than a general power function on the majority of hardware components of computing mechanisms.

Another possible approximation for the case when x*ln (T) is close to zero is the direct use of the simpler color coefficient correction from Schulze according to Equation 9. This may be combined with the simplification of the exponential function so that a simplified variant of Schulze's approach is provided as Equation 34:

$$C_i \frac{1 - (1 - \alpha_i)^x}{1 - (1 - \alpha_i)} \approx C_i \frac{-x * \ln(1 - \alpha_i)}{\alpha_i} \qquad \text{Eq. 34}$$

is achieved and is applicable when x or x*ln(T) is close to zero.

If the precondition for the approximations of Equation 33 or Equation 34 is satisfied (e.g., as early as the shading), for specific regions of the display data set or for specific rays, the precondition may be used. A value that falls below a threshold value for the ratio of desired sampling distance to target sampling distance multiplied with the modulation factor. An approximated, simpler formula is used to determine a third color coefficient. A power function with the ratio of desired sampling distance to target sampling distance multiplied with the modulation factor is Taylor-expanded as an exponent up to the second term. A formula resulting from another formula may additionally or alternatively provide a more simplified approach to determine the third color coefficients. As demonstrated above, the combination of the two approximation approaches results in Equation 34.

The provided method corresponds to an algorithm using at least two, two-dimensional pre-integration tables as input data, determined by the method disclosed above. Using the opacities and color coefficients stored in the pre-integration tables (via Equation 7 for the opacities and Equation 10 or Equation 21 for the color coefficients), it is then possible to determine the individual contributions for the desired sampling distance or desired sampling distances differing from the target sampling distance so that the contributions to Equation 4 are known and volume rendering integrals may, therefore, be determined.

One particularly advantageous algorithm is obtained when, in addition to the notional subdivision of the integration distance into subsections as described, the subdivision parameters are determined by an optimization method. Therefore, this then entails the combination of two thought processes:

A) The integration distance for the pre-integration may be divided into at least two subsections described by at least one subdivision parameter $\lambda_j$. If the color coefficients and opacities for these subsections are determined with a target sampling distance, d, the advance coefficients may be calculated for a general sampling distance, d', using Equation 10 or in the case of subdivision into two subsections by Equation 21. If the color function is a piecewise constant function, and therefore constant within the subsections, even the mathematically correct values of the corrected color coefficients for the sampling distance, d', would be obtained.

B) Theoretically, the subdivision parameter is freely selectable thus providing a degree of freedom. Therefore, it is suggested in the particularly preferred embodiment of the present disclosure is that these degrees of freedom be utilized in order to define an optimization problem and use the special division parameter that was determined in an optimization method that solves the optimization problem. The solution of the optimization problem may be embedded in the calculation of the second pre-integration table.

The section linking A) and B) provides results of excellent quality even when only one single division parameter, e.g. a single second pre-integration table is used. This combination of A) and B) may be termed "pre-integrated optimization" since the solution of an optimization problem is encoded in the generated pre-integration tables.

Further approaches for the improvement of the underlying algorithm that were discussed in detail above, are provided in that an optimization method was presented in order to be able to find the optimum division parameters. For example, x=0.5 introduces an simple metric during the pre-integration that only requires the calculation of square roots instead of general power functions during the optimization method so that it is possible to reduce the computational work on the part of the hardware. Another variant of the optimization method, Equation 26, was presented that is particularly efficient and does not require the calculation of the pre-integration table for x=0.5.

It was also demonstrated how, for the important case of RGB colors, despite the optimization performed, the pre-integration tables may be made available as RGBA tables without problems. It was also demonstrated how the algorithm may be used efficiently in cases of gradient opacity modulation. Also demonstrated were approximations that may be used with gradient opacity modulation when x or x*ln(T) is close to 0. Such situations may occur frequently with gradient opacity modulation.

The different embodiments of the direct volume-rendering algorithm described may achieve numerous advantages compared to the known prior art.

The method according to one embodiment permits extremely high-quality pre-integration for general sampling distances that necessitates only two, two-dimensional pre-integration tables. A high image quality of the display data set may be achieved with Guthe's algorithm, although Guthe's algorithm requires at least three pre-integration tables as input data. Guthe's approach frequently generates artifacts for two pre-integration tables so that it is not suitable for application requiring high image quality. Embodiments using only two, two-dimensional pre-integration tables are particularly advantageous because one single two-dimensional pre-integration table is not sufficient to cover the general case mathematically. An approach with two, two-dimensional pre-integration tables is theoretically (and now also practically) the best possible in this respect.

An advantage of determining high-quality display images with discretionary sampling distances using only two pre-integration tables instead of three pre-integration tables is that, during the volume rendering, it is only necessary to access two tables, instead of three tables. This feature is important, since volume rendering requires an extremely large number of pre-integration table accesses. In the case of two, two-dimensional pre-integration tables, the presented method significantly reduces the number of memory accesses required. This advantage will become even more important in the future since the computing power of processors is increasing to a significantly higher degree than the performance of storage mechanisms. Therefore, the requirements on storage mechanisms are significantly reduced in exemplary embodiments with respect to memory accesses are concerned.

A further advantage of the possibility of only using two, two-dimensional pre-integration tables instead of three two-dimensional pre-integration is the reduced storage space in the actual storage mechanisms. Even two-dimensional pre-integration tables may result in an extremely high storage space requirement with 16 bit source data sets so that the possibility of dispensing with a table of this kind is an extremely advantageous feature for the reduction of memory requirements.

In some homogeneous scenarios, the operator now has the choice of whether pre-integration with a constant target sampling distance may be performed. Discretionary desired sampling distances may be possible, although any desired sampling distances would have mathematical advantages. However, the additional costs in the complexity of computing mechanisms of approaches currently known in the prior art with a general sampling distance may prevent the use thereof. Embodiments requiring only two, two-dimensional pre-integration tables in order to use general desired sampling distances provides that the use of adapted desired sampling distances are advantageous. For example, trilinear interpolation may be performed in the source data set. The resultant volume within a group of eight voxels is infinitely frequently continuously differentiable. The boundary of these eight voxels are not continuous differentiability is not provided using some other methods. The possibility of arranging the sampling positions on such a boundary may be extremely expedient when the interpolated display parameter is to be sampled along a ray.

To enable the use of only two, two-dimensional pre-integration tables as input data, the solution of the optimization problem is integrated in one or more second pre-integration table. An important feature for a pre-integration algorithm suitable for practical use is that the calculation of the tables required may be performed interactively since the change of transfer functions is to be supported in real time. This feature is clearly fulfilled by the suggested algorithm in the embodiment disclosed. The optimization problem may be integrated with the calculation of the second pre-integration table. As far as the computing power required by the computing mechanism is concerned, the calculation of the pre-integration tables according to embodiments of volume rendering is ultimately only slightly "more expensive" than the calculation of two regular pre-integration tables. The values to be evaluated to find the optimums in the optimization method are only partial sums that are generated as a matter of course during the calculation of regular pre-integration tables. If x=0.5 is selected for such a case, the square root operations that occur may be performed particularly quickly by modern hardware in the implementing computing mechanism.

The approach described is not restricted to the use of linear functions for the approximation of s(z). For example, an article by J.-F. L. Hajjar et al., "Second Order Pre-Integrated Volume Rendering", Proc. IEEE Pacific Visualization Symp. (VIS 2008), pages 9-16 (hereinafter Hajjar), suggested a second order approach for color integration. The Hajjar pre-integration table is based on approximation with quadratic functions (and not linear functions). Four-dimensional pre-integration tables are thus provided for a general sampling distance. The embodiments for generating a display data set as provided herein, enable the depiction of the four-dimensional pre-integration tables but only require two three-dimensional pre-integration tables. While two-dimensional pre-integration tables are greatly preferable, the use of second order pre-integration with a general, discretionary sampling distance is more attractive if only three-dimensional pre-integration tables are required.

Although it may be preferable to assume a linear function of the location for the determination of the integrals of the pre-integration tables for the display parameter over the target sampling distance, a linear function is not required.

In addition to the method, disclosed embodiments also relate to a computing mechanism embodied to carry out the method of volume rendering. Embodiments may be transferred analogously to the computing mechanism, obtaining the named advantages. The computing mechanism may be an image-evaluation work station or even an image-recording mechanism, e.g., a CT mechanism that may be connected to an image-archiving system such as a PACS. It is also possible for the computing mechanism to be a rendering server capable of rendering processes in parallel. Embodiments using only one second pre-integration table, significantly reduce the requirements on computing power, the number of memory accesses, and the storage space while nevertheless providing high-quality display data sets.

Finally, disclosed embodiments of volume rendering also relate to a computer program that carries out the acts of the disclosed method when executed on a computing mechanism (e.g., computer or processor). All embodiments relating to the method and the computing mechanism may also be transferred to the computer program. Present-day technologies also advantageously enable the method according to the invention to be largely, or even completely, implemented as hardware. A computer program or software component may be stored on a non-transient data carrier, e.g., a CD-ROM, for the implementation of the method according to the invention.

At this point, the target sampling distance is ultimately freely selectable. Exemplary selections include the smallest edge distance or an average edge distance of a voxel of source data sets.

The scope of the present invention is defined solely by the appended claims and is not affected to any degree by the statements within this summary. The present embodiments may obviate one or more of the drawbacks or limitations in the related art.

BRIEF DESCRIPTION OF THE DRAWINGS

Further advantages and details of the present invention may be derived from the exemplary embodiments described below and with reference to the drawing that depicts.

DETAILED DESCRIPTION

Figure 1:
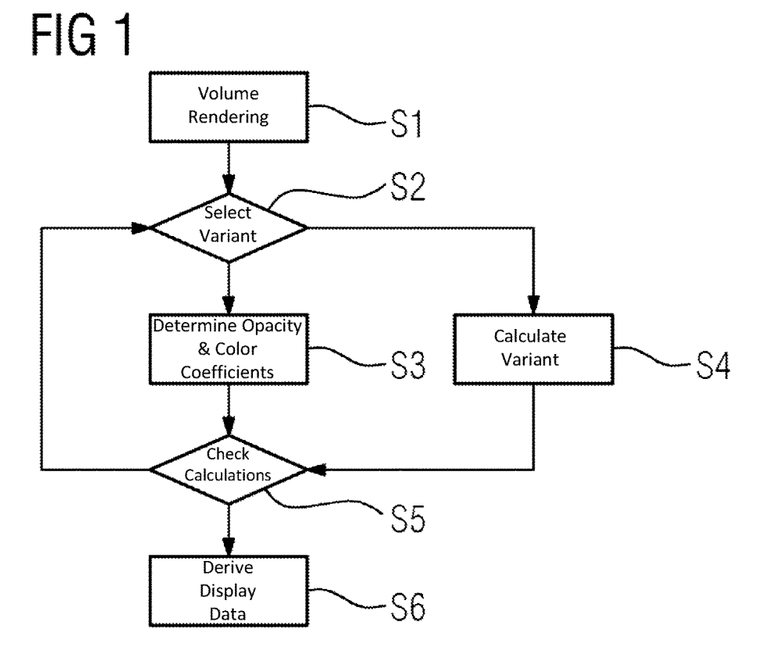
FIG. 1 an explanatory flow diagram for the use of the method according one embodiment of volume rendering.

FIG. 1 depicts the use of the method according to an embodiment of direct volume rendering of a source data set containing a scalar value of a display parameter, s, in each voxel. It is now assumed that two, two-dimensional pre-integration tables are already present in a storage mechanism that carries out the method according to FIG. 2. These pre-integration tables were determined for a target sampling distance, d, that was determined as the smallest edge distance of a voxel of possible source data sets. A pre-integration table, namely, the first pre-integration table, contains different front and back values $s_f$ and $s_b$ of the display parameter opacities α and color coefficients, C, for the entire integral distance [0,1], obtained by variable transformation from the target sampling distance. The second pre-integration table also contains opacities, α, and color coefficients, C, but in this case for a subsection [0, $\lambda_{opt}$]. The integration distance is divided into in two subsections.

Act S1 is representative of acts used in direct volume rendering. Direct volume rendering is not described in more detail here, since the method relates to the evaluation of the volume-rendering integral for different rays ("compositing"). Act S1 may include, in any sequence, the acts of classification, interpolation, shading and definition of the rays, either explicitly or implicitly. Act S1 may include an approximation of the volume-rendering integral of Equation 1. It may also be assumed that there is an RGB scheme for the color functions so that the pre-integration tables are present in RGBA format.

Any desired sampling distances may be selected for the individual rays to determine the display data set. With trilinear interpolation, the sampling positions may be on edges of interpolation groups of the voxels. Therefore, the approximated calculation of the volume-rendering integral, using Equation 4, converts the values derivable from the pre-integration tables from the target sampling distance to the desired sampling distance.

In this exemplary embodiment, the conversion may take place in two different ways. Selection of the variant is made in act S2 and may be performed during the shading. Selection further establishes a corresponding flag for the calculation.

However, act S2 and the associated calculation variant in act S4 are optional. S2 and its associated calculation variant in act SD4 may be only used when gradient opacity modulation is performed and/or selected by an operator e.g., in a user interface of the computing mechanism or from another computing mechanism requesting the calculation.

In the case of gradient opacity modulation, a check is performed to see whether the variable x*ln(T) is smaller than a threshold value, therefore close enough to 0 for an approximated formula, namely Equation 34, to be used in order to determine the color coefficients for the desired sampling distance. In this case, x, is defined according to Equation 32.

No approximation is performed or possible if no gradient opacity modulation is performed. In act S3, opacities and color coefficients for the sampling distance of a partial integral of the volume-rendering integral is determined for all partial integrals along a ray. To this end, a first opacity α(0,1), a second opacity α(0,$\lambda_{opt}$), first color coefficients C(0, 1), and second color coefficients C(0, $\lambda_{opt}$) are obtained from the first pre-integration table and from the second pre-integration table for the front and back values $s_f$ and $s_b$ of the partial interval under consideration. Equation 7 and Equation 21 now enable the calculation of the corresponding contributions for the partial integral. That is, the corresponding opacities α'(0,1) and C'(0,1) for the desired sampling distance of the partial interval under consideration. If these contributions are available for all partial integrals, Equation 4 may be used to determine the volume-rendering integral for the ray.

If gradient opacity modulation is used and approximation is possible, the only act S4 may be performed using Equation 33 instead of Equation 21.

Then, a check is performed in act S5 to determine whether all volume rendering integrals have been calculated. If not, the method is continued with act S2 for the next ray. If all volume rendering integrals are evaluated, the two-dimensional display data is derived therefrom in act S6 and may be provided to the requesting computing mechanism to display.

Even though any of a number of desired sampling distances may be selected, it is possible to determine display data sets in real time.

The transfer functions may be changed interactively, e.g., through a user interface of the computing mechanism or requesting the calculation from the computing mechanism. Then, the pre-integration tables are recalculated quickly due to the pre-integration tables dependency on the choice of transfer function, e.g., specifically upon the extinction function and the color function.

Figure 2:
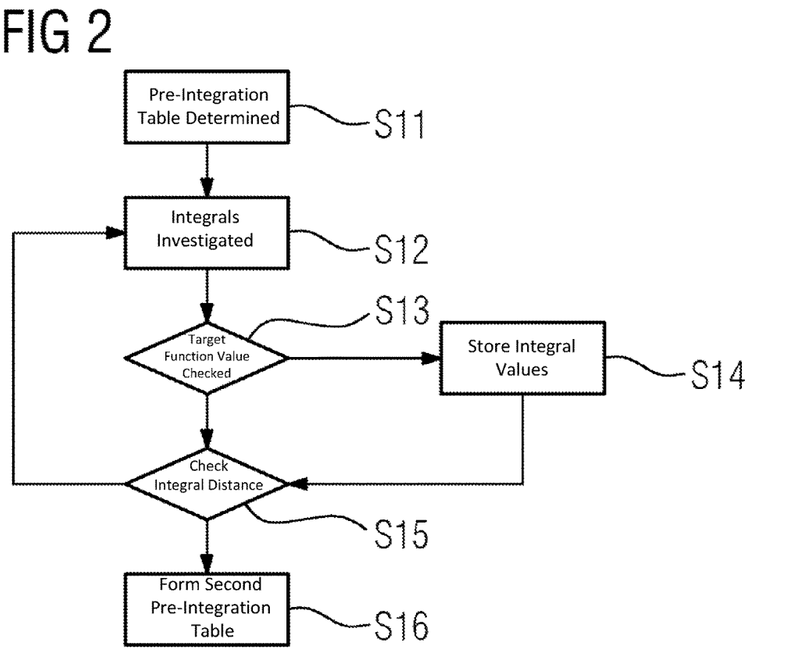
FIG. 2 a flow diagram for the determination of pre-integration tables according to one embodiment of volume rendering.

FIG. 2 depicts a preferred way to calculate the pre-integration tables according to an embodiment of volume rendering.

In act S11, the first pre-integration table for the target sampling distance, d, is determined. The pre-integration table may be determined using known techniques from the prior art. Here, a special algorithm is used, via constantly growing partial sums increasing further components of the integral. As with the growing partial sums technique, the pre-integration technique approximates the respective integral to be calculated because the selection of a linear approximation of the display parameter, s, is dependent on the location, z. The integrals to be calculated are obtained by Equation 5 and Equation 6.

If the second pre-integration table is to be determined, a slightly modified algorithm is used allowing an optimization method to be performed during the integration to determine an optimum subdivision parameter $\lambda_{opt}$ for each value pair $s_f$ and $s_b$. The optimum value of the subdivision parameter may be different for each entry in the pre-integration table; however, the subdivision parameter is not explicitly stored. The subdivision parameter may be implicitly stored via the corresponding integral value.

Therefore, in act S12, during the formation of the partial sums, the integrals for opacity and, in the case of RGB, three color coefficients of 0 are present up to a value of the subdivision parameter to be investigated. Accessing values from the already calculated first pre-integration table enables the target function to be determined for this interim value of the subdivision parameter defined by Equation 27 and Equation 26.

In act S13, the value of the target function most recently stored is checked to determine whether the most recently stored value of the target function is above the previous maximum value of the target function. If so, the integral values and the new maximum value are stored in act S14. However, if the value of the target function is less than the current maximum value stored, the method is continued directly with act S15. A check is performed to determine whether the integral distance has already been passed through completely. If the integral distance has not already been passed through completely, the next partial sums are determined in act S12.

The modified form of the pre-integration algorithm as described by acts S12 to S15, may be bypassed completely when, in act S16, the second pre-integration table is formed by using the most recently stored values for the integrals so that ultimately the values associated with the maximum are stored and form the second pre-integration table.

It is also noted at this point that x=0.5 was selected for the purposes of the determining the pre-integration tables. Accordingly, with x=0.5, the power functions may be executed as square roots particularly simply on the hardware of the computing mechanism used.

Figure 3:
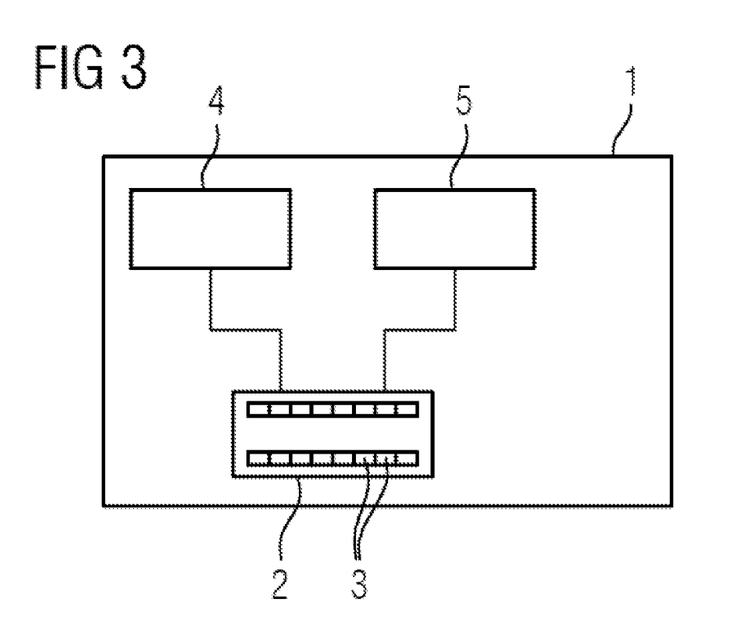
FIG. 3 a computing mechanism according to an embodiment of volume rendering.

FIG. 3 is a schematic diagram of a computing mechanism executing the method implemented by computer program according to certain embodiments. The computing mechanism 1 depicted may be embodied as a rendering server. A variety of users may be able to access the rendering server, via a network, in order to enable the rendering of diverse three-dimensional source data sets and obtain two-dimensional display data sets.

The computing mechanism 1 includes a computing unit or computer 2 with multiple processors 3 that may each include multiple processor cores, enabling high-grade parallelized calculation processes. The computing unit 2 accesses a storage mechanism 4 storing the pre-integration tables. Because only two, two-dimensional pre-integration tables are needed in some embodiments, less storage space is required in the storage mechanism 4 for these embodiments and the number of accesses to the storage mechanism 4 is also kept within limits. A further storage mechanism 5 is provided to store the computer program.

The computing mechanism 1 also may further include known components, including particular interfaces or connectors connecting the computing mechanism to the network and the like.

Parts of or all the method may be implemented by hardware components, may also provide further advantages.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

I claim:

1. A method for generating a display data set for depicting a three dimensional source data set of at least one display parameter through volume rendering, wherein a volume-rendering integral with an integrand and with an extinction function that assigns one extinction value for each distance to a value of the display parameter, and a color function that assigns at least one chromaticity for each path to the value of the display parameter is evaluated to determine the display data set and wherein the volume-rendering integral is broken down into contributions from third opacities as integrals dependent upon the extinction function and third color coefficients as integrals dependent upon the color function and the extinction function, wherein the color function and the extinction function are described by a front value and a back value of the display parameter and a desired sampling distance describing a interval used for integration, the method comprising, at least the following acts for the evaluation of the volume-rendering integral:

subdividing a integration distance into at least two subsections based on at least one subdivision parameter, wherein the integration distance is based on a fixed predetermined target sampling distance independent of the desired sampling distance;

providing a subsection number corresponding to a number of subsections of pre-integration tables, wherein the subsection number minus one corresponds to integrations over different subsections wherein the front value and the back value of the display parameter are assigned a target sampling distance opacity, wherein a contribution of the volume-rendering integral and at least one target sampling distance color coefficient are based on the target sampling distance opacity;

determining target sampling distance opacities and target sampling distance color coefficients based on pre-integration tables for each contribution of a plurality of contributions of the volume-rendering integral; calculating third opacities converted to the desired sampling distance from target sampling distance opacities and the ratio of desired sampling distance to target sampling distance;

calculating third color coefficients from target sampling distance opacities, target sampling distance color coefficients, and the ratio of desired sampling distance to target sampling distance; and determining the volume-rendering integral from the contributions.

2. The method of claim 1, further comprising:
calculating third opacities as $1-\alpha'(0,1)=(1-\alpha(0,1))^{d/d}$; and
calculating the third color coefficients as $$C'(0,1) = \sum_{i=0}^{n} C(\lambda_i, \lambda_{i+1}) \frac{1 - T(\lambda_i, \lambda_{i+1})^x}{1 - T(\lambda_i, \lambda_{i+1})} \prod_{j=0}^{i-1} T(\lambda_j, \lambda_{j+1})^x,$$

wherein

α'(0,1) designates the third opacity over the entire integration distance of 0 to 1, α(0,1) designates the opacity also optionally available as the target sampling distance opacity for the entire integration distance of 0 to 1 for the target sampling distance, C'(0,1) designates the third color coefficients over the entire integration distance of 0 to 1, $\lambda_i$ designates numbers ordered as subdivision parameters satisfying $0 \leq \lambda_i \leq \lambda_2 \leq \ldots \leq \lambda_n \leq 1$ with the convention that $\lambda_0 = 0$ and $\lambda_{n+1} = 1$, $C(\lambda_i, \lambda_{i+1})$ designates the target sampling distance color coefficients for the subsection between $\lambda_i$ and $\lambda_{n+1}$, $T(\lambda_i, \lambda_{i+1}) = 1 - \alpha(\lambda_i, \lambda_{i+1})$ designates the target sampling distance transparency for the subsection between $\lambda_i$ and $\lambda_{i+1}$, wherein $\alpha(\lambda_i, \lambda_{i+1})$ is the corresponding target sampling distance opacities, and $$x = \frac{d'}{d}$$

designates the ratio of the desired sampling distance d' to the target sampling distance, d.

3. The method of claim 1, further comprising:
determining the pre-integration tables via integrals evaluated over the integration distance, wherein the pre-integration tables include a first pre-integration table with first opacities and first color coefficients;
determining a second subsection number minus one based on second pre-integration tables with second opacities and second color coefficients;
evaluating, for one of a first subsection number minus one subsections, each integral of a plurality of integrals of the second opacities and the second color coefficients;
determining third color coefficients based on the first and second opacities, the first and second color coefficients, and the ratio of desired sampling distance to target sampling distance.

4. The method of claim 3, further comprising:
breaking the integration distance down into two subsections, wherein one second pre-integration table relates to the first subsection and the third color coefficients are calculated according to a formula $$C'(0,1) \approx C(0, \lambda_1) \frac{1 - T(0, \lambda_1)^x}{1 - T(0, \lambda_1)} + (C(0,1) - C(0, \lambda_1)) \frac{T(0, \lambda_1)^x - T(0,1)^x}{T(0, \lambda_1) - T(0,1)}.$$

5. The method of claim 1, further comprising:
determining the at least one subdivision parameter via an optimization method targeted at a minimization of the interval between third color coefficients based on integration and third color coefficients determined from target sampling distance opacities and target sampling distance color coefficients.

6. The method of claim 5, further comprising:
fixing the ratio between desired sampling distance and target sampling distance as 0.5.

7. The method of claim 5, wherein the optimization method further comprises: maximizing a defined target function wherein the defined target function is positive due to displacement; and determining an omission of the third color coefficients independent of the subdivision parameters via integration.

8. The method of claim 5, further comprising:
determining the pre-integration tables via integrals evaluated over the entire integration distance, wherein the pre-integration tables include a first pre-integration table with first opacities and first color coefficients;
determining the number minus one based on second pre-integration tables with second opacities and second color coefficients;
evaluating, for one of a first subsection number minus one subsections, each integral of a plurality of integrals of the second opacities and the second color coefficients;
determining third color coefficients based on the first and second opacities, the first and second color coefficients, and the ratio of desired sampling distance to target sampling distance;
determining the first pre-integration table prior to the determining of the optimization method;
performing the optimization method during the numerical integration,
wherein at least one second pre-integration table is determined using integrals from the first pre-integration table, and
wherein the method further comprises, after each part-act of the numerical integration of a plurality of part-acts of the numerical integration,
checking whether a new extreme value of the target function for the integrals, and
storing these integrals when a new extreme value is found.

9. The method of claims 5, further comprising:
simultaneously performing the optimization method for all colors via a target function performed as the sum of the target functions of the individual colors.

10. The method of claim 1, further comprising:
determining the volume-rendering integral dependent based on a modulated extinction function, wherein the modulated extinction function is dependent upon the amount of the three-dimensional gradient of the display parameter; and
applying a modulation factor to the ratio of desired sampling distance to target sampling distance during the evaluation volume-rending integral.

11. The method of claim 10, further comprising:
determining a third color coefficient based on an approximation formula when a precondition value falls below the threshold value for the ratio of desired sampling distance to target sampling distance multiplied with the modulation factor.

12. The method of claim 11, further comprising:
determining a power function, wherein the power function is determined by
multiplying the ratio of desired sampling distance to target sampling distance with the modulation factor;
Taylor-expanding as an exponent up to the second term; and
approximating third color coefficients.

13. The method of claim 1, further comprising:
assuming the display parameter over the target sampling distance as a linear function of the location for the determination of the integrals of the pre-integration tables.

14. A computing apparatus comprising:
at least one processor; and at least one memory including computer program code for one or more programs for generating a display data set for depicting a three dimensional source data set of at least one display parameter through volume rendering; wherein a volume-rendering integral with an integrand and with an extinction function that assigns one extinction value for each distance to a value of the display parameter, and a color function that assigns at least one chromaticity for each path to the value of the display parameter is evaluated to determine the display data set and wherein the volume-rendering integral is broken down into contributions from third opacities as integrals dependent upon the extinction function and third color coefficients as integrals dependent upon the color function and the extinction function, wherein the color function and the extinction function are described by a front value and a back value of the display parameter and a desired sampling distance describing an interval used for integration; wherein the at least one memory and the computer program code are configured to, with the at least one processor, cause the apparatus to:

subdivide an integration distance into at least two subsections based on at least one subdivision parameter, wherein the integration distance is based on a fixed predetermined target sampling distance independent of the desired sampling distance;

provide a subsection number corresponding to a number of subsections of pre-integration tables, wherein the subsection number minus one corresponds to integrations over different subsections wherein the front value and the back value of the display parameter are assigned a target sampling distance opacity, wherein a contribution of the volume-rendering integral and at least one target sampling distance color coefficient are based on the target sampling distance opacity;

determine target sampling distance opacities and target sampling distance color coefficients based on pre-integration tables for each contribution of a plurality of contributions of the volume-rendering integral;

calculate third opacities converted to the desired sampling distance from target sampling distance opacities and the ratio of desired sampling distance to target sampling distance;

calculate third color coefficients from target sampling distance opacities, target sampling distance color coefficients, and the ratio of desired sampling distance to target sampling distance; and determine the volume-rendering integral from the contributions.

15. A non-transitory computer readable medium including instructions for generating a display data set for depicting a three dimensional source data set of at least one display parameter through volume rendering; wherein a volume-rendering integral with an integrand and with an extinction function that assigns one extinction value for each distance to a value of the display parameter, and a color function that assigns at least one chromaticity for each path to the value of the display parameter is evaluated to determine the display data set and wherein the volume-rendering integral is broken down into contributions from third opacities as integrals dependent upon the extinction function and third color coefficients as integrals dependent upon the color function and the extinction function, wherein the color function and the extinction function are described by a front value and a back value of the display parameter and a desired sampling distance describing an interval used for integration, the instructions, when executed by a processor, are operable to perform:

subdividing an integration distance into at least two subsections based on at least one subdivision parameter, wherein the integration distance is based on a fixed predetermined target sampling distance independent of the desired sampling distance;

providing a subsection number corresponding to a number of subsections of pre-integration tables, wherein the subsection number minus one corresponds to integrations over different subsections wherein the front value and the back value of the display parameter are assigned a target sampling distance opacity, wherein a contribution of the volume-rendering integral and at least one target sampling distance color coefficient are based on the target sampling distance opacity;

determining target sampling distance opacities and target sampling distance color coefficients based on pre-integration tables for each contribution of a plurality of contributions of the volume-rendering integral;

calculating third opacities converted to the desired sampling distance from target sampling distance opacities and the ratio of desired sampling distance to target sampling distance;

calculating third color coefficients from target sampling distance opacities, target sampling distance color coefficients, and the ratio of desired sampling distance to target sampling distance; and determining the volume-rendering integral from the contributions.

16. The method of claim 2, further comprising:
determining the pre-integration tables via integrals evaluated over the integration distance, wherein the pre-integration tables include a first pre-integration table with first opacities and first color coefficients;
determining a second subsection number minus one based on second pre-integration tables with second opacities and second color coefficients;
evaluating, for one of a first subsection number minus one subsections, each integral of a plurality of integrals of the second opacities and the second color coefficients;
determining third color coefficients based on the first and second opacities, the first and second color coefficients, and the ratio of desired sampling distance to target sampling distance.

17. The method of claim 2, further comprising:
determining the at least one subdivision parameter via an optimization method targeted at a minimization of the interval between third color coefficients based on integration and third color coefficients determined from target sampling distance opacities and target sampling distance color coefficients.

18. The method of claim 3, further comprising:
determining the at least one subdivision parameter via an optimization method targeted at a minimization of the interval between third color coefficients based on integration and third color coefficients determined from target sampling distance opacities and target sampling distance color coefficients.

19. The method of claim 4, further comprising:
determining the at least one subdivision parameter via an optimization method targeted at a minimization of the interval between third color coefficients based on integration and third color coefficients determined from target sampling distance opacities and target sampling distance color coefficients.

20. The method of claim 6, wherein the optimization method further comprises:
   maximizing a defined target function wherein the defined target function is positive due to displacement; and
   determining an omission of the third color coefficients independent of the subdivision parameters via integration.

* * * * *